United States Patent
Ruijl

(10) Patent No.: US 6,662,462 B2
(45) Date of Patent: Dec. 16, 2003

(54) PRECISION MEASURING APPARATUS PROVIDED WITH A METROLOGY FRAME WITH A THERMAL SHIELD CONSISTING OF AT LEAST TWO LAYERS

(75) Inventor: Theo Anjes Maria Ruijl, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 10/140,507

(22) Filed: May 7, 2002

(65) Prior Publication Data

US 2002/0170199 A1 Nov. 21, 2002

(30) Foreign Application Priority Data

May 10, 2001 (EP) .............................. 01201724

(51) Int. Cl.[7] .............................................. G01B 5/008
(52) U.S. Cl. ............................................ 33/704; 33/503
(58) Field of Search ....................... 33/704, 703, 1 M, 33/503

(56) References Cited

U.S. PATENT DOCUMENTS

| | | | | |
|---|---|---|---|---|
| 4,653,011 A | * | 3/1987 | Iwano | 33/503 |
| 4,741,112 A | * | 5/1988 | Band et al. | 33/503 |
| 5,396,712 A | * | 3/1995 | Herzog | 33/503 |
| 6,058,618 A | * | 5/2000 | Hemmelgarn et al. | 33/503 |
| 6,202,316 B1 | * | 3/2001 | Swift et al. | 33/503 |
| 6,370,787 B1 | * | 4/2002 | Kikuchi | 33/503 |

OTHER PUBLICATIONS

Patents Abstracts of Japan; JP62224524A (Mitsubishi Electric Corp.), Oct. 2, 1987.

K.H. Breyer and H.G. Pressel in "Progress in Precision Engineering", pp. 56–76 entitled "Paving the Way to Thermally Stable Coordinate Measuring Machines", Springer Verlag, New York. (Date Unknown).

* cited by examiner

Primary Examiner—Christopher W. Fulton
(74) Attorney, Agent, or Firm—Frank Keegan

(57) ABSTRACT

Precision measuring apparatus like Co-ordinate Measuring Machines (CMMs) are very susceptible to deformations due to temperature variations and gradients. In a known CCM such variations are counteracted by providing parts of the apparatus with an insulating PUR layer. According to the invention the metrology frame 2 of the measuring apparatus is provided with a heat shield 12, 15 which includes an inner layer 12, having a comparatively high heat resistance, and an outer layer (14) which has a comparatively low heat resistance. Temperature gradients causing deformations of the metrology frame 2 are thus effectively reduced, whereas homogeneous temperature variations can be easily compensated for by means of software correction. Moreover, the shield acts as a low-pass filter which reduces the temperature disturbances due to short-term heat inputs.

5 Claims, 4 Drawing Sheets

PRECISION MEASURING APPARATUS PROVIDED WITH A METROLOGY FRAME WITH A THERMAL SHIELD CONSISTING OF AT LEAST TWO LAYERS

The invention relates to an apparatus for the measurement or machining of an object, which apparatus is provided with positioning means for positioning a part of the apparatus that is to be positioned relative to a frame of the apparatus, which frame of the apparatus includes a metrology frame which is provided at least partly with a thermal shield.

An apparatus of this kind is known from a publication by K. H. Breyer and H. G. Pressel in "Progress in Precision Engineering", pp. 56–76, entitled "Paving the Way to Thermally Stable Coordinate Measuring Machines", Springer Verlag, New York. Precision measuring apparatus can be used, for example, in component mounting machines, in wafer steppers for the manufacture of integrated circuits, in printers or in coordinate measuring machines for determining the shape of an object to be measured. Generally speaking, temperature fluctuations, that is, fluctuations in time as well as in space, constitute the major source of positioning and/or measuring uncertainty in such apparatus.

In order to realize apparatus exhibiting a low susceptibility to thermal disturbances, it would be feasible to manufacture such apparatus, or at least the parts thereof which are decisive in respect of the precision (the metrology frame), of a material having a (very) low coefficient of thermal expansion. Such a material, whose coefficient of expansion may be a factor of 1000 smaller than that of customary structural metals, is known, for example, as Zerodur™. This material, however, has the drawback that it is much more expensive than customary structural metals and that it is also difficult to carry out machining operations on this material.

Another approach to solving the problem of thermal disturbances in measuring apparatus is to provide thermal insulation for the entire measuring apparatus or for the parts of the apparatus which have a comparatively strong effect on the measuring precision of the apparatus. The cited publication describes (notably on page 74) a precision measuring apparatus which is provided with a granite table for accommodating the object to be measured. The known apparatus is also provided with a metrology frame which includes positioning means in the form of bridge-like carriers which are intended to displace a part of the apparatus, that is, a part in the form of a measuring probe, in the x direction, the y direction and the z direction. Parts of these bridge-like carriers and a part of the granite table are provided with an insulating layer of polyurethane foam. This insulating layer may be considered to form a thermal shield.

In the context of the present invention a metrology frame for an apparatus for measuring or machining an object is to be understood to mean that part of the frame of the apparatus which determines the information concerning the position of the part of the apparatus to be positioned relative to the frame of the apparatus. A part of the frame of the apparatus which contributes to the supporting or positioning of parts of the apparatus or of the object to be measured, but does not transfer said information, therefore, does not form part of the metrology frame.

Even though this known method of thermal insulation offers an improvement in comparison with a non-insulated apparatus, the known apparatus is still susceptible to a number of thermal effects. It is attempted to counteract the latter effects by using the cited materials having a low coefficient of thermal expansion for some parts.

It is an object of the invention to provide an apparatus of the kind set forth in which the disturbing thermal effects are counteracted better. To this end, the apparatus in accordance with the invention is characterized in that the thermal shield consists of at least an inner shielding layer and an outer shielding layer, which outer shielding layer has a thermal conductivity which is higher than that of the inner shielding layer.

The invention is based on the recognition of two facts. The first fact is the insight that it will never be possible to completely avoid temperature variations of the apparatus in practical circumstances. Therefore, an apparatus of this kind, usually being provided with a system for automatic data processing (a computer for control of the apparatus and for processing the measured quantities), will be arranged to carry out software corrections on the data on the basis of the temperature deviations measured at the site of the apparatus, that is, in such a manner that the actual values to be measured (that is, the dimensions of the object to be measured) are approximated better. This first insight means that such a software correction can be performed in a much more reliable manner when the deformation behavior of the parts of relevance of the apparatus can be suitably predicted. The latter is the case when the temperature of the apparatus deviates from the nominal temperature, but is practically the same for the entire apparatus. In that case only one temperature sensor is required and the software corrections, moreover, correspond to a high degree to the expected shape deviations in the metrology frame of the apparatus, so that a smaller correction uncertainty is obtained. The requirement as regards a uniformly distributed temperature deviation is met to a high degree in that on the outer side (that is, the side wherefrom the disturbing thermal influences originate) the shield is provided with a thermally suitably conductive outer layer which, because of its suitable conductivity, neutralizes any temperature gradients to a high degree. Any small temperature gradients still remaining are transferred to the metrology frame of the apparatus only after thorough attenuation by the thermally insulating inner layer, so that the temperature deviation, moreover, is very small.

The second insight on which the invention is based is that any temperature fluctuations have a disturbing effect which is greater as they have a shorter period, viewed in time, that is, when they have a comparatively high frequency. This can be understood by realizing that a sudden temperature variation outside the shield causes a temperature gradient inside the shield, because the material inside the shield does not have time to equalize the applied temperature variation by conduction; as has already been described, temperature gradients must be avoided. The latter condition is satisfied by the thermal capacity of the outer shielding layer which must first be heated before the transfer of heat to the metrology frame can take place. In this case the combination of the two shielding layers acts as a low-pass filter for temperature fluctuations.

The inner shielding layer in an advantageous embodiment of the invention is formed by atmospheric air. This embodiment offers the advantage that it is inexpensive and that there are no materials on the inner side of the layer which could contaminate the sensitive measuring zone of the apparatus. Moreover, if pressure contact is realized between the insulating air and the ambient air, the apparatus can also be readily used in a conditioned atmosphere. Its use in low pressure conditions (partial or complete vacuum) is not problematic either in that case, because the insulating air is automatically also evacuated. A further advantage of the use of air (generally speaking, the use of a gas) for the inner shielding layer over an inner shielding layer in the form of a solid material (for example, polyurethane foam) consists in that a solid material which makes contact with the metrology frame will exert a force on the metrology frame in the case of thermal deformation. Even though such forces will be small, in apparatus for precision measurements (measurements of displacements of the order of magnitude of nanometers) they can still cause inadmissible deformations in the metrology frame. Such forces do not occur when air is used. The thickness of the layer of air is dependent inter alia on the dimensions of the apparatus, and hence on the shield, but preferably is not greater than approximately 2 cm in order to avoid convection.

The outer shielding layer in another advantageous embodiment of the invention is made of metal. This material can be readily machined and constitutes a comparatively good thermal conductor. The metal is preferably aluminum. The thickness of the aluminum layer of the shield is dependent inter alia on the dimensions of the apparatus, and hence of the shield, and of the desired degree of suppression of external temperature gradients, but is preferably larger than 3 mm.

In another embodiment of the invention the outer side of the outer shielding layer is provided with a surface layer which has a radiation absorption coefficient which is smaller than that of the material of the outer shielding layer. This step is based on the recognition of the fact that much of the heat applied to such apparatus originates from radiation sources in the vicinity of the apparatus. Even when the apparatus is arranged in a shielded space, the operating staff will still radiate heat to the apparatus and in many instances other radiating light sources are also present.

The invention will be described in detail hereinafter with reference to the Figures in which corresponding elements are denoted by corresponding reference symbols. Therein:

Figure 1:
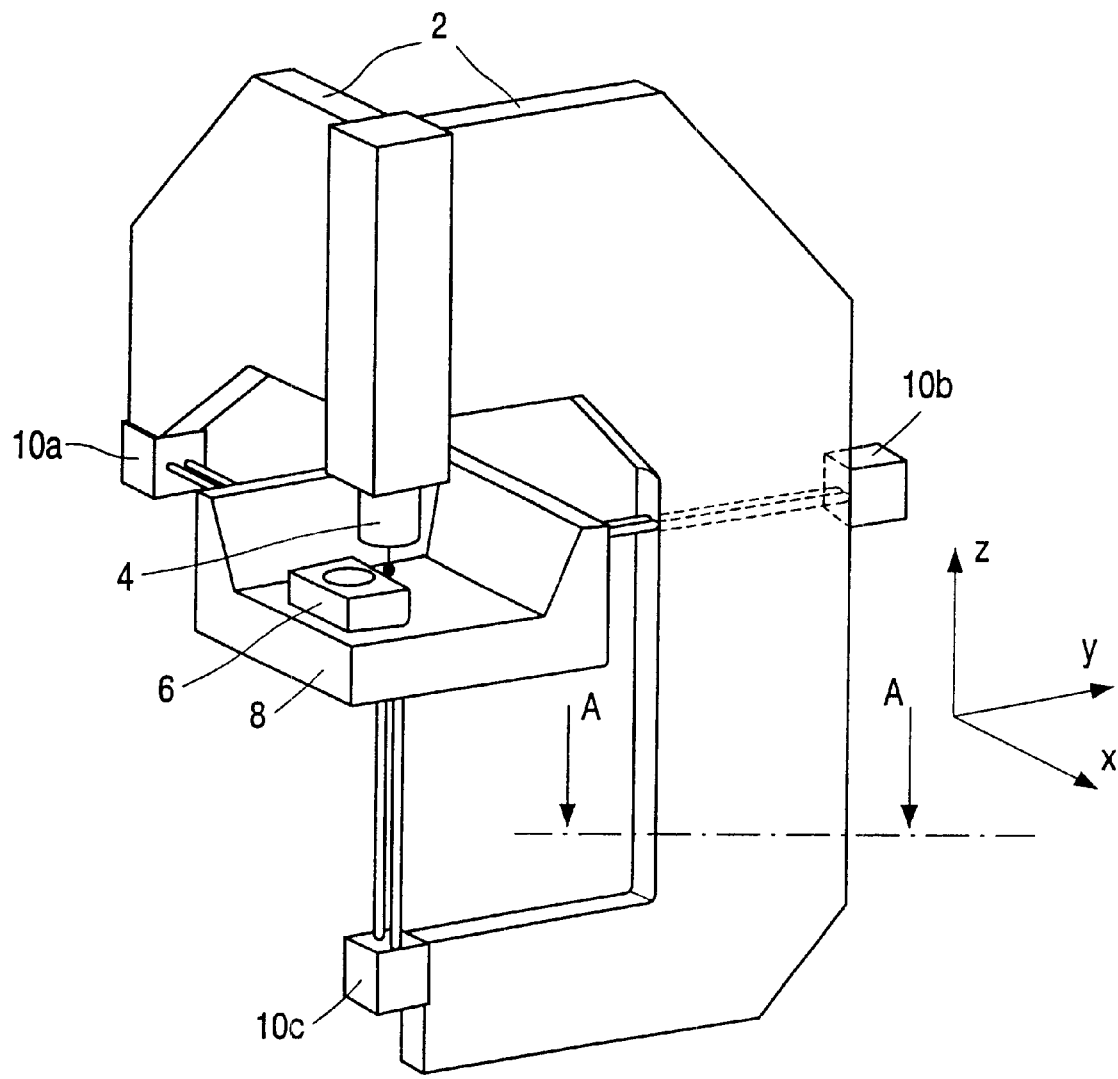
FIG. 1 is a perspective view of the parts of relevance of an apparatus in accordance with the invention.

FIG. 1 shows a part of an apparatus for measuring or machining an object. For example, the dimension or the shape of an object to be measured must be determined in such an apparatus. The part of the apparatus which is shown includes a metrology frame 2 which, in the case of a measuring apparatus, carries a measuring probe 4 for sensing the object 6 to be measured. This object is arranged on an object carrier 8 which is displaceable in three coordinate directions by means of positioning means which are not shown in the Figure. In this case the part of the apparatus to be positioned relative to the frame (so the metrology frame 2) of the apparatus is, therefore, the object carrier 8.

The measurement of the object is performed by displacing the object carrier relative to the measuring probe until it contacts the object and by recording the associated position of the object carrier. In order to determine the position of the object carrier relative to the metrology frame, there is provided a system of laser distance sensors which are known per se and which operate on the basis of the interference principle. In order to determine the position of the object carrier 8 in this manner, it is provided with three mirrors (not shown in the Figure) which are situated on the outer side of the object carrier, that is, each mirror in a respective coordinate plane. With each of the mirrors there is associated a respective source of laser light 10a, 10b and 10c. These lasers may be separate lasers but the sources may also be formed by one laser only wherefrom the laser light is conducted in the direction of each of the mirrors, for example, via optical fibers. Using such laser sources and mirrors, a laser distance sensor which operates on the basis of the interference principle is formed for accurate determination of the position of the object carrier. The signal derived from the laser distance sensor is applied to a computer (not shown) which controls the positioning means on the basis of said signal in such a manner that the object carrier reaches the desired position.

It is to be noted that the positioning means which are not shown in the Figure and which serve for the displacement of the object carrier 8 in the three co-ordinate directions contribute to the supporting and positioning of the object carrier 8, but the information concerning the position of the object carrier is not transferred by these positioning means, so that these means do not form part of the metrology frame.

Figure 2:
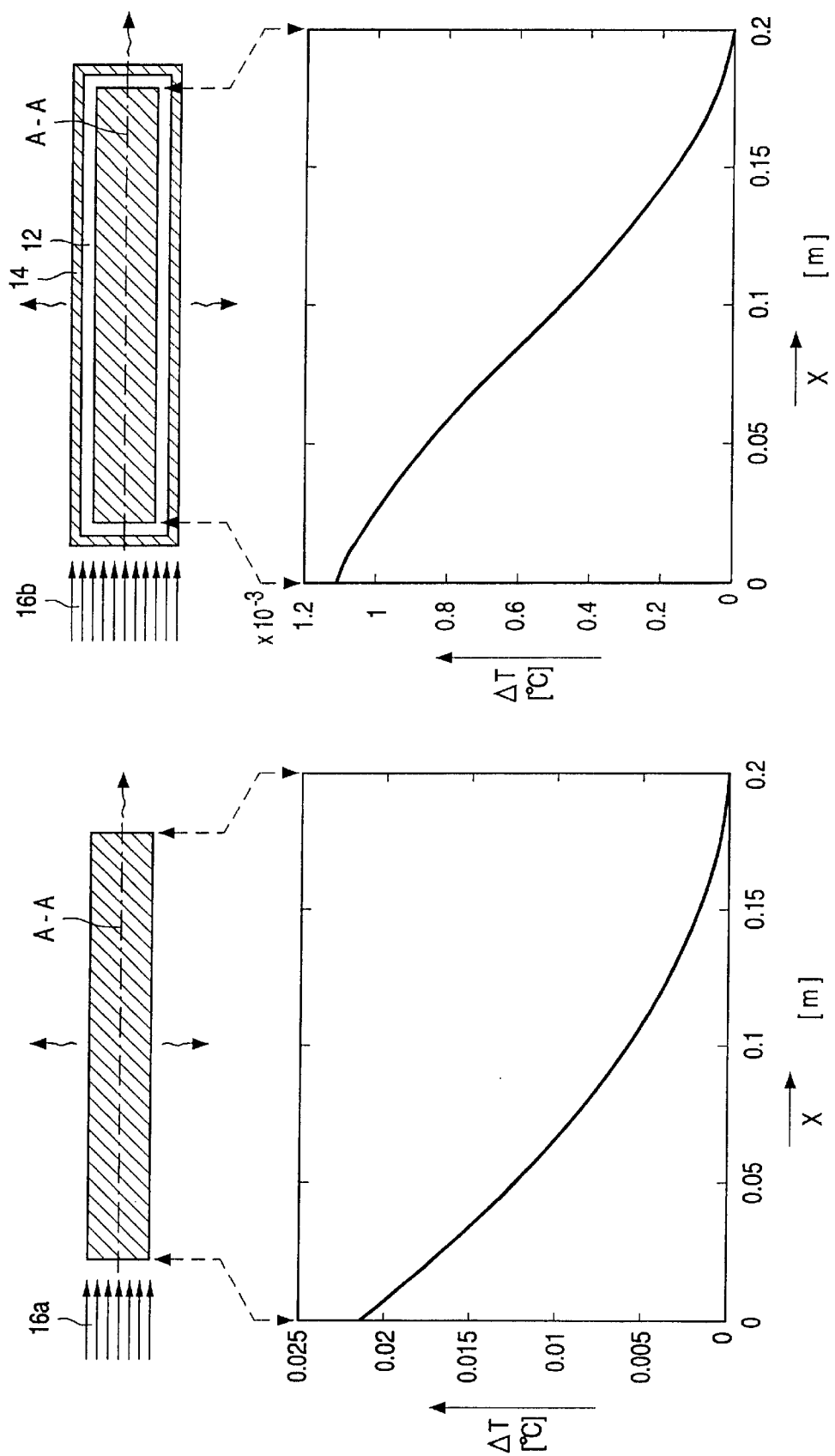
FIG. 2 is a graphic representation of the effect of a shielding layer on the temperature of a structural part of the apparatus.

FIG. 2 is a graphic representation of the effect of a shielding layer on the temperature of a structural part of the apparatus. The top figure at the left-hand side of FIG. 2 shows a cross-section of the measuring frame 2, taken along the line A—A (see FIG. 1), while the right-hand side of FIG. 2 shows a similar cross-section of the metrology frame, be it in this case provided with a thermal shield which consists of an inner shielding layer 12 of atmospheric air and an outer shielding layer 14 of aluminum. It will be apparent that in this case the outer shielding layer 14 exhibits a thermal conductivity which is much higher than that of the inner shielding layer 12.

It is assumed that at the left-hand side of the two cross-sections A—A a given heat flow 16a and 16b, respectively, is applied (that is to say, a given quantity of heat per unit of time and per unit of irradiated surface area). The applied heat flow is dissipated to the environment again by heat transfer, so that in the stationary case an associated temperature distribution arises in the two cross-sections.

The temperature distributions arising in the two cross-sections are graphically represented in the lower two parts of FIG. 2. These temperature distributions have been calculated by means of a 2-D (two-dimensional) finite elements method. It has been assumed that the cross-section A—A has a dimension of 200×30 mm, that the layer of air 12 and the aluminum layer 14 both have a thickness of 5 mm, that the heat flows 16a and 16b are 30 W/m$^2$, and that the transfer coefficient from the aluminum to the ambient air is 5 W/m$^2$K. The temperature difference ΔT between the left end and the right end of the cross-section A—A is plotted as a function of the distance x on the vertical axis of the two graphs. It has been found that in the non-shielded cross-section this temperature difference is approximately 0.02° C., whereas it is approximately 0.001° C. in the shielded cross-section; the shielding shown thus yields a reduction of the temperature gradient by a factor of approximately 20.

Figure 3:
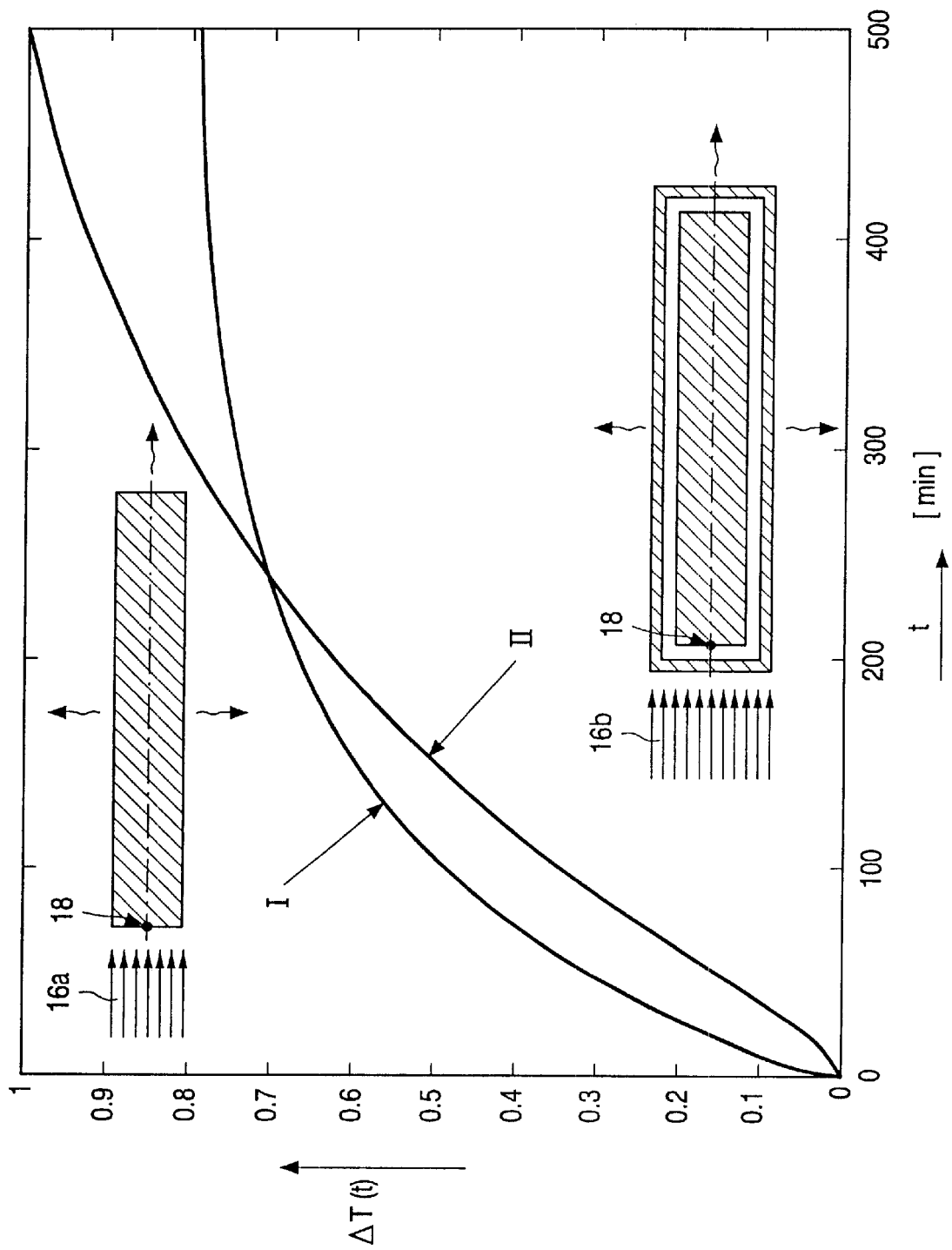
FIG. 3 is a graphic representation of the thermal behavior as a function of time of a structural part of the apparatus provided with a shielding layer.
Figure 4A:
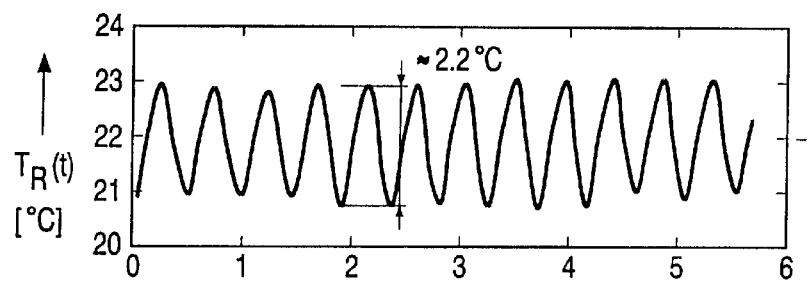
FIG. 4 shows a number of graphic representations of the effect of the ambient temperature as a function of time on a structural part of the apparatus provided with a shielding layer.
Figure 4B:
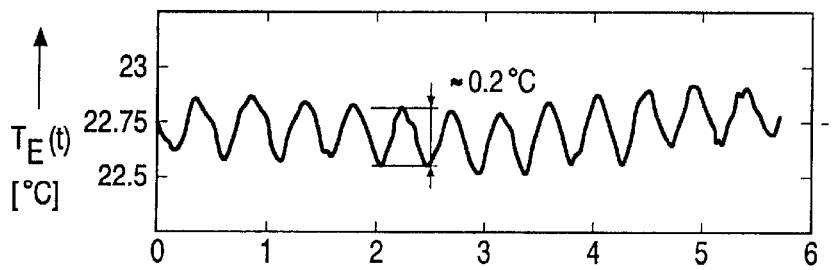
Figure 4C:
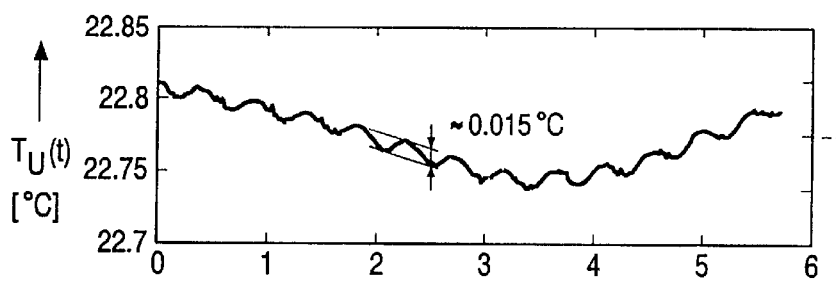
Figure 4E:
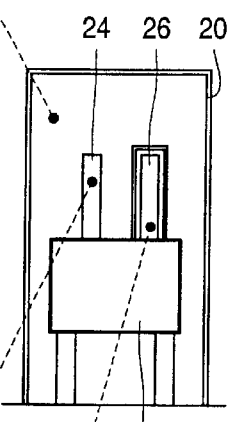
Figure 4D:
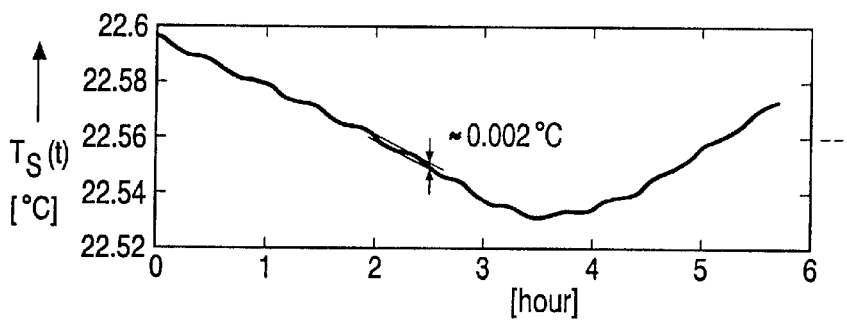

FIG. 3 is a graphic representation of the temperature behavior as a function of time of the cross-section A—A of the metrology frame 2 (FIG. 1) of the apparatus with and without a shielding layer. The top part of the Figure represents a cross-section of the metrology frame 2 taken along the line A—A, while the lower part of the Figure shows a similar cross-section of the metrology frame, be it in this case provided with a thermal shield consisting of an inner shielding layer 12 of atmospheric air and an outer shielding layer 14 of aluminum.

Like in FIG. 2, it is assumed that a given heat flow 16a and 16b, respectively, is applied to the left-hand side of the two cross-sections A—A. The applied heat flow increases the temperature of the cross-section A—A as a function of time; in order to demonstrate the effect of a low-pass filter, the temperature is chosen at the center 18 of the left-hand side of the cross-section.

The temperature variation of the point 18 as a function of time in the two cross-sections is graphically represented in FIG. 3 in which the curve I represents the situation without shielding while the curve II represents the situation with shielding. These temperature variations have been calculated by means of a 2-D finite elements method. For this calculation the same assumptions have been made as for FIG. 2. The temperature increase $\Delta T(t)$ of the point 18 is plotted as a function of time on the vertical axis of the graph. The temperature increase of the shielded situation (curve II) after 500 minutes is chosen as a unit. It has been found that for short periods, that is, periods shorter than approximately 150 minutes, the temperature increase for the shielded cross-section (curve II) is significantly smaller than for the non-shielded cross-section (curve I). This demonstrates the effect of the thermal shield as a low-pass filter for temperature variations.

FIG. 4 shows a number of graphic representations as a function of time of the effect of the ambient temperature on the metrology frame 2 of the apparatus with and without a shielding layer. A metrology frame is now arranged in an enclosure 20 in a room in which temperature variations occur as a function of time. The walls of the enclosure are made of polycarbonate and are coated with a layer which blocks infrared radiation so that thermal radiation from, for example operating staff or lighting from the room is reduced. A metrology frame 24 without thermal shielding as well as a metrology frame 26 with thermal shielding in accordance with the invention are arranged on a table 22 in the enclosure 20 as shown in FIG. 4e. FIG. 4a shows the measured temperature variation $T_R(t)$ of the atmosphere within the room; FIG. 4b shows the measured temperature variation $T_E(t)$ of the atmosphere within the enclosure; FIG. 4c shows the measured temperature variation $T_U(t)$ of the metrology frame 24 without shielding (unshielded), and FIG. 4d shows the measured temperature variation $T_{S(t)}$ of the metrology frame 26 with shielding (shielded).

The temperature variation is measured over a period of 6 hours. Graph 4a shows that the room temperature $T_R(t)$ exhibits a variation of approximately 2.2° C. with a period of approximately 0.46 hours, whereas the temperature variation $T_E(t)$ in the enclosure 20 (FIG. 4b) amounts to only approximately 0.2° C. The short-term temperature variation $T_U(t)$ of the non-shielded metrology frame 24 due to the temperature variation TE(t) in the enclosure appears to have been reduced to the order of magnitude of 0.015° C. The long-term variation of the mean temperature of the unshielded metrology frame 24 can be explained on the basis of the long-term variation of the mean temperature of the room, which variation is hardly expressed because of the larger scale value of FIG. 4a. The advantageous effect of the thermal shielding in accordance with the invention is clearly visible in FIG. 4d which shows that the short-term temperature variation (whereby disturbing temperature gradients can be produced) of the shielded metrology frame 26 is of the order of magnitude of 0.002° C. As has already been stated, the long-term variation of the mean temperature of the shielded metrology frame 26 causes hardly any disturbing temperature gradients.

What is claimed is:

1. An apparatus for the measurement or machining of an object (6), which apparatus is provided with positioning means for positioning a part of the apparatus (8) that is to be positioned relative to a frame of the apparatus, which frame of the apparatus includes a metrology frame (2) for determining information concerning the position of the part, said metrology frame is provided at least partly with a thermal shield (12, 14), characterized in that the thermal shield consists of at least an inner shielding layer (12) and an outer shielding layer (14), which outer shielding layer has a thermal conductivity which is higher than that of the inner shielding layer.

2. An apparatus as claimed in claim 1, in which the inner shielding layer (12) is formed by atmospheric air.

3. An apparatus as claimed in claim 1, in which the outer shielding layer (14) is formed by metal.

4. An apparatus as claimed in claim 3, in which the metal is aluminum.

5. An apparatus as claimed in claim 1, in which the outer side of the outer shielding layer is provided with a surface layer which has a radiation absorption coefficient which is lower than that of the material of the outer shielding layer.

* * * * *